(12) United States Patent
Beguerisse-Díaz et al.

(10) Patent No.: US 12,327,196 B2
(45) Date of Patent: Jun. 10, 2025

(54) SYSTEMS AND METHODS FOR PERFORMING RANDOM WALKS ON KNOWLEDGE GRAPHS

(71) Applicant: Spotify AB, Stockholm (SE)

(72) Inventors: Mariano Beguerisse-Díaz, London (GB); Till A. Hoffmann, London (GB); Dimitrios Korkinof, London (GB)

(73) Assignee: Spotify AB, Stockholm (SE)

( * ) Notice: Subject to any disclaimer, the term of this patent is extended or adjusted under 35 U.S.C. 154(b) by 983 days.

(21) Appl. No.: 17/333,385

(22) Filed: May 28, 2021

(65) Prior Publication Data

US 2021/0374555 A1    Dec. 2, 2021

Related U.S. Application Data

(60) Provisional application No. 63/031,857, filed on May 29, 2020.

(51) Int. Cl.
*G06N 5/02*    (2023.01)

(52) U.S. Cl.
CPC ..................... *G06N 5/02* (2013.01)

(58) Field of Classification Search
None
See application file for complete search history.

(56) References Cited

U.S. PATENT DOCUMENTS

| | | | |
|---|---|---|---|
| 8,433,670 B2 * | 4/2013 | Chidlovskii | G06Q 10/10 706/46 |
| 10,349,134 B2 | 7/2019 | Hamiti et al. | |
| 10,546,507 B2 | 1/2020 | Popat et al. | |
| 2016/0086498 A1 | 3/2016 | Popat et al. | |
| 2018/0332347 A1 | 11/2018 | Hamiti et al. | |
| 2019/0392330 A1 | 12/2019 | Martineau et al. | |

FOREIGN PATENT DOCUMENTS

WO    2020065906    4/2020

OTHER PUBLICATIONS

Ning, Nianwen, Bin Wu, and Chengcheng Peng. "Representation learning based on influence of node for multiplex network." In 2018 IEEE Third International Conference on Data Science in Cyberspace (DSC), pp. 865-872. IEEE, 2018. (Year: 2018).*

(Continued)

*Primary Examiner* — Vincent Gonzales
(74) *Attorney, Agent, or Firm* — McDonnell Boehnen Hulbert & Berghoff LLP

(57) ABSTRACT

Systems, methods and computer program products are provided for performing random walks on knowledge graphs. Knowledge graphs are received and for each knowledge graph there is constructed a multilayer network having unipartite layers and bipartite layers and interlayer couplings that (i) connect nodes of the unipartite layers and the bipartite layers representing the same entity (ii) are directed and (iii) weighted with a weight that depends on an activity of a target node in the unipartite layer or bipartite layer in which the target node resides. A walk on a random walk model of the multilayer network that takes into account saliencies of the different interlayer and intralayer connections of the nodes is then processed and one or more actions based on the random walk model are performed.

20 Claims, 9 Drawing Sheets

(56) References Cited

OTHER PUBLICATIONS

Ai, Qingyao, et al., "Learning Heterogeneous Knowledge Base Embeddings for Explainable Recommendation", Algorithms, vol. 11, No. 137 (2018), 16 pages.
Amburg, Ilya, et al., "Clustering in graphs and hypergraphs with categorical edge labels", arXiv:1910.09943v2 [cs.SI] Feb. 17, 2020, 13 pages.
Beguerisse-Diaz, M., et al., "Competition for popularity in bipartite networks", Chaos, 20 (2010), p. 043101, https://doi.org/10.1063/1.3475411, 12 pages.
Bell, R.M., et al., "Modeling Relationships at Multiple Scales to Improve Accuracy of Large Recommender Systems", KDD'07, San Jose, CA, USA, Aug. 12-15, 2007, San Jose, CA, 10 pages.
Bellomarini, L., et al., "The Vadalog System: Datalog-based Reasoning for Knowledge Graphs", Proc. VLDB Endow., vol. 11, No. 9 (2018), pp. 975-987, https://doi.org/10.14778/3213880.3213888.
Bergstra, J. et al., "Random Search for Hyper-Parameter Optimization", Journal of Machine Learning Research, 13 (2012), pp. 281-305.
Carass, A., et al., "Evaluating White Matter Lesion Segmentations with Refined Sorensen-Dice Analysis", Scientific Reports, 10 (2020), pp. 1-19.
Chang, Yan-Shuo, et al., "Refined Spectral Clustering via Embedded Label Propagation", Neural Computation, 29 (2017), pp. 3381-3396, https://doi.org/10.1162/neco a 01022.
Chaudhari, S., et al., "An Entity Graph Based Recommender System", AI Communications, 30 (2017), pp. 141-149.
Chen, X., et al., "A review: Knowledge reasoning over knowledge graph", Expert Systems with Applications, 141 (2020), p. 112948, https://doi.org/10.1016/j.eswa.2019.12948, 21 pages.
Covington, P., et al., "Deep Neural Networks for YouTube Recommendations", in Rec. Sys., Sep. 15-19, 2016, Boston, MA, USA, https://doi.org/10.1145/2959100.2959190, pp. 191-198.
Cramer, H., et al., "Assessing and Addressing Algorithmic Bias in Practice", Interactions, 25 (Nov./Dec. 2018), pp. 58-63.
De Domenico, M. et al., "Navigability of interconnected networks under random failures", PNAS, Jun. 10, 2014, vol. 111, No. 23, pp. 8351-8356, https://doi.org/10.1073/pnas.1318469111.
Del Corso, G., et al., "Fast PageRank Computation via a Sparse Linear System", Internet Mathematics, vol. 2, No. 3 (2005), pp. 251-273.
Desrosiers, C., et al., "A Comprehensive Survey of Neighborhood-based Recommendation Methods", Chapter 4, Recommender Systems Handbook, Eds. F. Ricci et al., DOI 10.1007/978-0-387-85820-3_4, Springer Science and Business Media, LLC, 2011, 38 pages.
Dong, X. L., "Challenges and Innovations in Building a Product Knowledge Graph," in KDD, Aug. 19-23, 2018, London, UK, p. 2869.
Dong, X.L., et al., "Knowledge Vault: A Web-Scale Approach to Probabilistic Knowledge Fusion", in KDD, 2014, 10 pages.
Dong, Y. et al., "Metapath2vec: Scalable Representation Learning for Heterogeneous Networks", in KDD, Aug. 13-17, 2017, Halifax, NS, Canada, pp. 135-144, https://doi.org/10.1145/3097983.3098036.
Ebert, R., "Amores perros", Apr. 13, 2001, https://www.rogerebert.com/reviews/amores-perros-2001, 16 pages.
Ehrlinger, Lisa et al., "Towards a Definition of Knowledge Graphs", Semantics (Posters, Demos, SUCCESS), 48, Sep. 13-14, 2016, 4 pages.
Eksombatchai, C., et al., "Pixie: A System for Recommending 3+ Billion Items to 200+ Million Users in Real-Time", in WWW, 2018, pp. 1775-1784.
Gilotte, A., et al., "Offline A/B testing for Recommender Systems", in WSDM, 5-9 Feb. 5-9, 2018, Marina Del Rey, CA, USA, pp. 198-206.
Gleich, David, "PageRank Beyond the Web", SIAM Review, vol. 57, No. 3 (2015), pp. 321-363.
Gope, J., et al., "A Survey on Solving Cold Start Problem in Recommender Systems", in Int. Conf. on Computing, Communication & Automation (ICAA), 2017, 6 pages.
Gruson, A., et al., "Offline Evaluation to Make Decisions About Playlist Recommendation Algorithms", Session 7: E-Commerce and Recommendation, in WSDM, Feb. 11-15, 2019, Melbourne, Aus., pp. 420-428.
Guo, L., et al., "Learning to Exploit Long-term Relational Dependencies in Knowledge Graphs", Proceedings of the 36th International Conference on Machine Learning, Long Beach, CA, PMLR 97, 2019, 13 pages.
Harper, F., et al., "The Movielens Datasets: History and Context", ACM Transactions on Interactive Intelligent Systems (tiis), vol. 5, No. 4, (2015), 20 pages.
Higham D., et al., "The Sleekest Link Algorithm", Mathematics Today, vol. 39, Dec. 2003, pp. 192-197.
Hug, N., "Surprise, a Python library for recommender systems", 2020 Jour. Open Source Software (JOSS), 5(52), 3 pages.
Jaderberg, M., et al,. "Population based training of neural networks", arXiv preprint arXiv:1711.09846, 2017, 21 pages.
Kivelä, M., et al., " Multilayer networks." Journal of Complex Networks (2014) 2, 203-271.
Lambiotte, R. et al., "From networks to optimal higher-order models of complex systems", Nature Physics, 15(4) (2019), pp. 313-320.
Lu,, L., et al., Recommender Systems, Physics Reports, 519 (2012), pp. 1-49, https://doi.org/https://doi.org/10.1016/j.physrep.2012.02.006.
Martin, T., et al., "Localization and centrality in networks", 2014 Phys. Rev. E, 90.052808, https://doi.org/10.1103/PhysRevE.90.052808, 8 pages.
Masuda, N., et al., "Random walks and diffusions on networks." Physics Reports 716-717 (2017) 1-58.
McInerney, J., et al., "Explore, Exploit, and Explain: Personalizing Explainable Recommendations with Bandits", in Rec. Sys., Oct. 2-7, 2018, Vancouver, BC, Canada, pp. 31-39.
Monti, F., et al., "Geometric Matrix Completion with Recurrent Multi-Graph Neural Networks", in NIPS, Proceedings of the 34th International Conference on Machine Learning, 2017, Long Beach, CA, pp. 3697-3707.
Mu, R., et al., "Collaborative Filtering Recommendation Algorithm Based on Knowledge Graph", Hindawi, Mathematical Problems in Engineering, vol. 2018, Article ID 9617410, https://doi.org/10.1155/2018/9617410, 15 pages (article has since been retracted).
Newman, M.E.J., "The Structure and Function of Complex Networks." SIAM Review, vol. 45, No. 2, 2003, pp. 167-256.
Nikolakopoulos, A., et al., "Personalized Diffusions for Top-N Recommendation", In Proceedings of the 13th ACM Conference on Recommender Systems, Rec Sys '19, Sep. 16-19, 2019, 9 pages.
Page, L., et al., "The PageRank Citation Ranking: Bringing Order to the Web", in WWW, Jan. 29, 1998, 17 pages.
Rosvall, M., et al., "Memory in network flows and its effects on spreading dynamics and community detection", Nature Communications, 5(1) (2014), pp. 1-13.
Salha, G., et al., "Keep It Simple: Graph Autoencoders Without Graph Convolutional Networks", 33rd Conference on Neural Information Processing Systems, arXiv:1910.00942, (2019), https:/arxiv.org/abs/1910. 00942, 18 pages.
Seneta, E., "Non-negative Matrices and Markov Chains", Springer Series in Statistics, Springer-Verlag, New York, 1981, ISBN 038790598-37, 22 pages.
Shi, Yue, et al., "Collaborative Filtering beyond the User-Item Matrix: A Survey of the State of the Art and Future Challenges", ACM Comput. Surv., vol. 47, No. 1, Article 3, Apr. 2014, https://doi.org/10.1145/2556270, 45 pages.
Sun, Zhu, et al., "Recurrent Knowledge Graph Embedding for Effective Recommendation", In Proceedings of the 12th ACM Conference on Recommender Systems, RecSys '18, Vancouver, BC, Canada, Oct. 2-7, 2018, pp. 297-305. URL http://doi.acm.org/10.1145/3240323.3240361.
Szomszor, M., et al., "Folksonomies, the Semantic Web, and Movie Recommendation", in 4th European Semantic Web Conf., Jun. 7, 2007, 15 pages.
Takács, G., et al., "Matrix factorization and neighbor based algorithms for the Netflix prize problem", In Proceedings of the 2008 ACM Conference on Recommended Systems, RecSys '08, pp. 267-274, New York, NY, USA, 2008, Association for Computing

(56) References Cited

OTHER PUBLICATIONS

Machinery, ISBN 9781605580937. doi: 10.1145/1454008.1454049. URL https://doi.org/10.1145/1454008.1454049.

Taylor, Dane, "Multiplex Markov Chains: Convection Cycles and Optimality", arXiv, 2004. 12820 (2020), https://arxiv.org/abs/2004.2820, 12 pages.

The Movie Database (TMDb), 2008, https://www.themoviedb.org/ (accessed Jun. 1, 2021), 33 pages.

Toni, T., et al., "Approximate bayesian computation scheme for parameter inference and model selection in dynamical systems." Journal of the Royal Society Interface, 6(31):187-202, 2009.

Vig, J., et al., "The Tag Genome: Encoding Community Knowledge to Support Novel Interaction", ACM Trans. Interact. Intell. Syst., vol. 2, No. 3, Article 13, Sep. 2012, https://doi.org/10.1145/2362394.2362395, 45 pages.

Wang, Z., et al., "Graph-based Recommendation on Social Networks", in 2010 12th Int. Asia-Pacifc Web Conf., 2010 IEEE, pp. 116-122, https://doi.org/10.1109/APWeb.2010.60.

Xian, Y., et al., "Reinforcement Knowledge Graph Reasoning for Explainable Recommendation", in SIGIR, Jul. 21-25, 2019, Paris, France, 10 pages.

Yang, S., et al., "Fast Top-K Search in Knowledge Graphs", in 32nd Int. Conf. on Data Engineering (ICDE), 2016, pp. 990-1001.

Ying, Rex, et al., "Graph Convolutional Neural Networks for Web-Scale Recommender Systems", in KDD, Aug. 19-23, 2018, 10 pages.

Yu, Xiao, et al., "Personalized Entity Recommendation: A Heterogeneous Information Network Approach", In Proceedings of the 7th ACM International Conference on Web Search and Data Mining, WSDM 2014, pp. 283-292, https://doi.rg/10.1145/2556195.2556259.

Zheng, G., et al., "DRN: A Deep Reinforcement Learning Framework for News Recommendation", in WWW, Apr. 23-27, 2018, pp. 167-176, https://doi.org/10.1145/3178876.3185994.

Dewancker, Ian, et al., "Bayesian optimization primer", 2015, SIGOPT Research, 4 pages.

Diestel, R., "Graph Theory", (Graduate Texts in Mathematics), Springer, 2017 ISBN 978-3-662-53621-6, 448 pages.

Hogan, A., et al., "Knowledge Graphs", arXiv:2003.02320, (2021), https://arxiv.org/abs/2003.02320, 136 pages.

Manning, C. D., et al., "An Introduction to Information Retrieval", CUP, 2009 Online Edition, Cambridge, 569 pages.

Poursabzi-Sangdeh, F., et al., "Manipulating and Measuring Model Interpretability", CHI, May 8-13, 2021, Yokohama, JP, arXiv, 1802.07810, 67 pages.

Ricci, F., et al., "Recommender Systems Handbook", Springer, 2010. ISBN 0387858199, 9780387858197, 845 pages.

Rossi, A., et al., "Knowledge Graph Embedding for Link Prediction: A Comparative Analysis", arXiv, 2002.00819 (2020), 41 pages.

Siroker D., et al., "A/B Testing: The Most Powerful Way to Turn Clicks Into Customers", Wiley, 2013, 21 pages.

\* cited by examiner $$\tilde{A} = \begin{array}{c} \text{Role B1} \\ \text{Role B2} \\ \text{Role B3} \\ \text{Role A1} \\ \text{Role A2} \\ \text{Role A3} \\ \text{Role C1} \end{array} \begin{bmatrix} \text{Role B1} & \text{Role B2} & \text{Role B3} & \text{Role A1} & \text{Role A2} & \text{Role A3} & \text{Role C1} \\ & \alpha_{1,2}A^{\text{role B1}} & \alpha_{1,3}A^{\text{role B1}} & \alpha_{1,4}B^{\text{layer\_1T}} & & & \\ \alpha_{2,1}A^{\text{role B2}} & & \alpha_{2,3}A^{\text{role B2}} & & \alpha_{2,5}B^{\text{layer\_2T}} & & \\ \alpha_{3,1}A^{\text{role B3}} & \alpha_{3,2}A^{\text{role B3}} & & & & & \alpha_{3,7}B^{\text{layer\_4T}} \\ \alpha_{4,1}B^{\text{layer\_1}} & & & & \alpha_{4,5}A^{\text{role A1}} & \alpha_{4,6}A^{\text{role A1}} & \\ & \alpha_{5,3}B^{\text{layer\_2}} & & \alpha_{5,4}A^{\text{role A2}} & & \alpha_{5,6}A^{\text{role A2}} & \\ & & & \alpha_{6,4}A^{\text{role A3}} & \alpha_{6,5}A^{\text{role A3}} & & \alpha_{6,6}B^{\text{layer\_3}} \\ & & \alpha_{7,3}B^{\text{layer\_4}} & & & & \end{bmatrix}$$

SYSTEMS AND METHODS FOR PERFORMING RANDOM WALKS ON KNOWLEDGE GRAPHS

CROSS REFERENCE TO RELATED APPLICATIONS

This application claims priority to, and the benefit of, U.S. Provisional Patent Application Ser. No. 63/031,857, filed May 29, 2020, which is hereby incorporated by reference in its entirety.

TECHNICAL FIELD

Embodiments of the present invention generally relate to information technology and sequencing and, more particularly, to random walk techniques for sequencing nodes in a multilayer network.

BACKGROUND

A knowledge graph (KG) acquires and integrates information into an ontology. A typical KG has several entries that describe real-world entities like people, places, and things. These entities form the nodes of the KG, and are sometimes called KG entities.

One issue with such a KG is that the semantic relationships (i.e., the connections) are not necessarily directly comparable to each other, and the entities within the same KG may be of different types (e.g., a city, a person, a gene). Because the different connections in a KG may not necessarily be directly comparable, there exist added challenges to the implementation and interpretation of graph-analysis and navigation methods. For systems that need to sequence nodes in a graph automatically, diversity of types of nodes and connections creates a technical problem because they must now compare nodes and connections that are a priori not directly compatible.

Recommendation systems based on collaborative filtering (CF) process large amounts user data to predict which items they are most likely to interact with, given their and all of the other users' activity. The success of CF systems have made them a mainstay in research and practice. In many cases, user-item interactions alone are not enough to achieve the desired performance. For this reason several recommendation systems combine collaborative filtering approaches with annotations and KGs to enrich their recommendations. A common approach to generate node embeddings is using machine learning methods such as graph convolutional networks or matrix factorizations. Other methods work directly on graph structures using random walks and diffusion processes to produce recommendations.

Although embedding methods can achieve impressive performance, their recommendations are can be difficult to explain; which has prompted work on understanding and explaining recommendations. Furthermore, the geometry of embedding spaces can be complex, which can present difficulties in recommendation tasks such as proximity search and multi-seeding. Another important challenge that arises is that it is difficult to address issues of fairness, interpretability and bias in complex machine learning systems. From a modelling perspective, one concern that that arises in some embedding methods is that may not be fully exploiting the rich structure of the KG, or that they may not be distinguishing between connections in the KG of different type.

There is a need, therefore, for an improved mechanism for generating thematic item-item recommendations that can complement collaborative filtering approaches, enables thematic exploration and has the ability to incorporate new content with or without user data, which helps overcome the cold-start problem. There is also a need to exploit the full structure of the KG while maintaining the distinction between the different types of connections.

SUMMARY

The example embodiments described herein meet the above-identified needs by providing systems, methods and computer program products for performing parametrized random walks on a collection of knowledge graphs. In an example embodiment, a system including a memory and one or more processors are provided. The memory stores instructions, which when executed by the one or more processors, cause the one or more processors to receive a plurality of knowledge graphs. For each knowledge graph the one or more processors construct a multilayer network having unipartite layers and bipartite layers (that can be weighted or unweighted) and interlayer couplings that (i) connect nodes of the unipartite layers and the bipartite layers representing an entity (i.e., the same entity) (ii) are directed and (iii) weighted with a weight that depends on an activity of a target node in the unipartite layer or bipartite layer in which the target node resides. The one or more processors process a random walk model of the multilayer network that takes into account saliencies of the different interlayer and intralayer connections of the nodes. In turn, the one or more processors perform one or more actions based on the random walk model. The one or more actions includes sequencing, grouping (e.g., clustering), and constructing representations of (e.g., embedding) the plurality of nodes in the multilayer network. In some embodiments, actions include assigning the nodes to different groups (e.g., community detection), identifying key entities (e.g., the most important ones), understanding the effect that severing a connection has on processes that occurs on the graph, and so on.

In an example embodiment, a system for performing random walks on knowledge graphs is provided. The system comprises a memory and one or more processors. The memory and processors operate to:
  receive a plurality of knowledge graphs,
  for each knowledge graph:
    construct a multilayer network having unipartite layers and bipartite layers and interlayer couplings that (i) connect nodes of the unipartite layers and the bipartite layers representing an entity (e.g., the same entity) (ii) are directed and (iii) weighted with a weight that depends on an activity of a target node in the unipartite layer or bipartite layer in which the target node resides;
    process a random walk model of the multilayer network that takes into account saliencies of the different interlayer and intralayer connections of the nodes; and
    perform one or more actions based on the random walk model.

In another example embodiment, a system for performing random walks on knowledge graphs is provided comprising a memory and one or more processors. The memory and processors operate to:
  receive a plurality of knowledge graphs, each knowledge graph having a plurality of entities and a collection of types of labeled connections representing the relationships of the plurality of entities, each labeled connection being weighted or unweighted and each entity having: (i) an entity type and (ii) a set of connections with other entities in the knowledge graph, generate, for each type of labeled connection, a monolayer network, wherein each entity of the entity types connected by the labeled connection is represented by a node, thereby generating a plurality of monolayer networks, assemble the plurality of monolayer networks into a multilayer network, wherein each layer of the multilayer network corresponds to one of the plurality of monolayer networks, wherein two or more nodes that represent the same entity are linked by an interlayer coupling, receive a first plurality of coupling strengths, each of the first coupling strengths corresponding to one of the labeled connections, receive a second plurality of coupling strengths, each second coupling strength corresponding to the couplings between nodes across layers of the multilayer network that represent the same entity, construct a random walk model on the multilayer network, wherein a probability of visiting a first node of the plurality of nodes from a second node of the plurality of nodes is proportional to (i) the weight of the labeled connection between the first node and the second node divided by the sum of all the weights of the connections that originate from the second node and multiplied by the first coupling strength of the corresponding labeled connection, or (ii) the second coupling strength of the coupling between the nodes across layers of the multilayer network that represent the same entity, and perform one or more actions based on the random walk model.

In yet another embodiment there is provided a system for performing random walks on knowledge graphs. The system includes a memory and one or more processors. The memory and one or more processors operate to:

(A) receive a plurality of knowledge graphs, each knowledge graph (x) having (i) a plurality of entities, each entity having an entity type and (ii) a plurality of labeled connections representing the relationships of the plurality of entities, each labeled connection having (i) a label and (ii) a pair of specified entity types including a first entity type and a second entity type and (y) connecting a plurality of pairs of entities of the specified entity types, and (z) being weighted or unweighted, (B) generate, for each entity type, a unique ordering of all the entities belonging to that entity type, (C) generate, for each labeled connection,
  (1) a monolayer network, wherein each entity of the specified entity types is represented by a node, wherein a labeled connection having a distinct pair of specified entity types is a bipartite monolayer network, and labeled connection having a non-distinct pair of specified entity types is a unipartite monolayer network, thereby generating a plurality of monolayer networks,
  (2) an adjacency matrix for each monolayer network, having:
    a number of columns (i) equal to the number of entities of the first entity type and (ii) each column representing an entity of the first entity type in the unique ordering of the entities,
    a number of rows (i) equal to the number of entities of the second entity type and (ii) each row representing an entity of the second entity type in the unique ordering of the entities, and
    wherein each entry of the adjacency matrix has (i) a zero value if the entities represented by the column and row do not have a connection of the labeled connection and (ii) a non-zero value if the entities represented by the column and row do have a connection of the labeled connection, the non-zero value corresponding to the weight of the connection if the monolayer network is weighted and one (1) if the connection of the labeled connection is an unweighted connection,
  (3) one role for each of the specified entity types, wherein all entities of that entity type inherit the role,
  (4) an activity array for each role, the activity array having a length equal to the number of entities of each distinct specified entity type, wherein the position of the entity in the activity array corresponds to the position of the entity in the unique ordering of the entities of the entity type, wherein the value of each entry in the activity array corresponds to a function of a degree or a weighted degree in the monolayer network associated to the role,
  (5) a coupling matrix, for every role, having a number of columns and a number of rows equal to the number of entities of the entity type, each column and row representing each entity in the same ordering as the unique ordering as in the activity array and containing in a main diagonal of the coupling matrix the activity array corresponding to the role and zeros everywhere else, (D) generate, for a subset of the plurality of monolayer networks:
  a multilayer network wherein, each layer of the multilayer network corresponds to the monolayer network of each of the labeled connections in the subset of the monolayer networks of labeled connections, wherein nodes that represent the same entity in different layers of the multilayer network are connected to each other,
  a supra-adjacency matrix of the multilayer network having (i) a block structure determined by the roles that appear in the subset of the plurality of monolayer networks, and (ii) an equal number of columns and row blocks, (iii) one block for each role, each of the blocks having a size equal to the number of entities of the entity type associated to the role,
  each role in the block-columns of the supra-adjacency matrix is a source-role, and each role in the block-rows of the supra-adjacency matrix is a target-role, wherein:
    (i) the adjacency matrices of the unipartite monolayer networks from the labeled connections between entities of the same entity type are placed on the block of the supra-adjacency matrix corresponding to the intersection of the block column and block row corresponding to the same role,
    (ii) the adjacency matrices of the bipartite monolayer networks from the labeled connections between entities of different entity types are placed on two locations of the supra-adjacency matrix including:
      (A) one in the block column of a first role and block row of a second role, and
      (B) transposed in the block column of the second role and the block row of the first role,
    (iii) a plurality of weighted directed interlayer couplings between all nodes that represent the same entity in different roles, each weighted directed interlayer coupling being represented, for every ordered pair of roles that belong to the same entity type in the supra-adjacency matrix by the coupling matrix of a target role that is placed in the block column of a source role and the block row of the target role, (E) receive a plurality of coupling saliences (non-negative, real numbers), each of the coupling saliences corresponding to a non-empty block of the supra-adjacency matrix;

(F) constructing a random walk model on the multilayer network, (G) perform one or more actions based on the random walk model.

The memory and one or more processors can also operate to perform automated selection and output of data corresponding to the one or more entities.

In some embodiments, the memory and one or more processors further operate to perform: automated selection and output of data corresponding to the one or more entities from the context in which the data has been generated and stored based on entity relationships or node relationships with other entities or nodes.

In yet other embodiments, the memory and one or more processors further operate to automatically select the data and cause the data to be locally stored within a computer, thereby enabling access to the data via the computer.

In some embodiments, the one or more processors further operate to automatically select the data and transmit the data to a computer, thereby enabling access to the data by the computer.

In another example embodiment, there is provided a computer implemented method for performing random walks on knowledge graphs. The method includes receiving a plurality of knowledge graphs. For each knowledge graph, the method further performs: constructing a multilayer network having unipartite layers and bipartite layers and interlayer couplings that (i) connect nodes of the unipartite layers and the bipartite layers representing the same entity (ii) are directed and (iii) weighted with a weight that depends on an activity of a target node in the unipartite layer or bipartite layer in which the target node resides; processing a random walk model of the multilayer network that takes into account saliencies of the different interlayer and intralayer connections of the nodes; and performing one or more actions based on the random walk model.

In another example embodiment, there is provided, a computer implemented method for performing random walks on knowledge graphs, comprising: receiving a plurality of knowledge graphs; generating, for each type of labeled connection of the knowledge graphs, a monolayer network; assembling the plurality of monolayer networks into a multilayer network; receiving a first plurality of coupling strengths; receiving a second plurality of coupling strengths; constructing a random walk model on the multilayer network, and performing one or more actions based on the random walk model.

With respect to receiving a plurality of knowledge graphs, each knowledge graph having a plurality of entities and a collection of types of labeled connections representing the relationships of the plurality of entities, each labeled connection being weighted or unweighted and each entity having: (i) an entity type and (ii) a set of connections with other entities in the knowledge graph. With respect to generating, for each type of labeled connection, a monolayer network, each entity of the entity types connected by the labeled connection is represented by a node, thereby generating a plurality of monolayer networks. With respect to assembling the plurality of monolayer networks into a multilayer network, each layer of the multilayer network corresponds to one of the plurality of monolayer networks, where two or more nodes that represent the same entity are linked by an interlayer coupling. With respect to receiving a first plurality of coupling strengths, each of the first coupling strengths corresponds to one of the labeled connections. With respect to receiving a second plurality of coupling strengths, each second coupling strength corresponds to the couplings between nodes across layers of the multilayer network that represent the same entity. With respect to constructing a random walk model on the multilayer network, a probability of visiting a first node of the plurality of nodes from a second node of the plurality of nodes is proportional to (i) the weight of the labeled connection between the first node and the second node divided by the sum of all the weights of the connections that originate from the second node and multiplied by the first coupling strength of the corresponding labeled connection, or (ii) the second coupling strength of the coupling between the nodes across layers of the multilayer network that represent the same entity.

In another example embodiment, there is provided a computer implemented method for performing random walks on knowledge graphs, comprising:

(A) receiving a plurality of knowledge graphs, each knowledge graph (x) having (i) a plurality of entities, each entity having an entity type and (ii) a plurality of labeled connections representing the relationships of the plurality of entities, each labeled connection having (i) a label and (ii) a pair of specified entity types including a first entity type and a second entity type and (y) connecting a plurality of pairs of entities of the specified entity types, and (z) being weighted or unweighted, (B) generating, for each entity type, a unique ordering of all the entities belonging to that entity type, (C) generating, for each labeled connection,
(1) a monolayer network, wherein each entity of the specified entity types is represented by a node, wherein a labeled connection having a distinct pair of specified entity types is a bipartite monolayer network, and labeled connection having a non-distinct pair of specified entity types is a unipartite monolayer network, thereby generating a plurality of monolayer networks, (2) an adjacency matrix for each monolayer network having:
 a number of columns (i) equal to the number of entities of the first entity type and (ii) each column representing an entity of the first entity type in the unique ordering of the entities,
 a number of rows (i) equal to the number of entities of the second entity type and (ii) each row representing an entity of the second entity type in the unique ordering of the entities, and
 wherein each entry of the adjacency matrix has (i) a zero value if the entities represented by the column and row do not have a connection of the labeled connection and (ii) a non-zero value if the entities represented by the column and row do have a connection of the labeled connection, the non-zero value corresponding to the weight of the connection if the monolayer network is weighted and one (1) if the connection of the labeled connection is an unweighted connection, (3) one role for each of the specified entity types, wherein all entities of that entity type inherit the role, (4) an activity array for each role, the activity array having a length equal to the number of entities of each distinct specified entity type, wherein the position of the entity in the activity array corresponds to the position of the entity in the unique ordering of the entities of the entity type, wherein the value of each entry in the activity array corresponds to a function of a degree or a weighted degree in the monolayer network associated to the role, (5) a coupling matrix, for every role, having a number of columns and a number of rows equal to the number of entities of the entity type, each column and row representing each entity in the same ordering as the unique ordering as in the activity array and containing in a main diagonal of the coupling matrix the activity array corresponding to the role and zeros everywhere else, (D) generate, for a subset of the plurality of monolayer networks:

a multilayer network wherein, each layer of the multilayer network corresponds to the monolayer network of each of the labeled connections in the subset of the monolayer networks of labeled connections, wherein nodes that represent the same entity in different layers of the multilayer network are connected to each other, a supra-adjacency matrix of the multilayer network having (i) a block structure determined by the roles that appear in the subset of the plurality of monolayer networks, and (ii) an equal number of columns and row blocks, (iii) one block for each role, each of the blocks having a size equal to the number of entities of the entity type associated to the role, each role in the block-columns of the supra-adjacency matrix is a source-role, and each role in the block-rows of the supra-adjacency matrix is a target-role, wherein:

(i) the adjacency matrices of the unipartite monolayer networks from the labeled connections between entities of the same entity type are placed on the block of the supra-adjacency matrix corresponding to the intersection of the block column and block row corresponding to the same role, (ii) the adjacency matrices of the bipartite monolayer networks from the labeled connections between entities of different entity types are placed on two locations of the supra-adjacency matrix including:

(A) one in the block column of a first role and block row of a second role, and (B) transposed in the block column of the second role and the block row of the first role, (iii) a plurality of weighted directed interlayer couplings between all nodes that represent the same entity in different roles, each weighted directed interlayer coupling being represented, for every ordered pair of roles that belong to the same entity type in the supra-adjacency matrix by the coupling matrix of a target role that is placed in the block column of a source role and the block row of the target role, (E) receiving a plurality of coupling saliences (non-negative, real numbers), each of the coupling saliences corresponding to a non-empty block of the supra-adjacency matrix;

(F) constructing a random walk model on the multilayer network, and (G) performing one or more actions based on the random walk model.

In some embodiments, an entity can have one or more roles. In some embodiments, each labeled connection also has a temporal attribute. In some embodiments, the pair of specified entity types can be the same entity types or distinct entity types. The value of each entry in the activity array can correspond to (i) an in-degree or out-degree, (ii) the weighted degree, or (iii) a combination of (i) and (ii).

In some embodiments, a probability of visiting a second node of the plurality of nodes from a first node of the plurality of nodes is equal to an entry in the supra-adjacency matrix having a column number of the supra-adjacency matrix corresponding to the first node and a row number of the supra-adjacency matrix corresponding to the second node multiplied by the salience of the entry and divided by the sum of all the entries of the sum of all the entries of the column corresponding to the first node, each entry of the column multiplied by its corresponding salience, thereby constructing a rate matrix of a random walk on the supra-adjacency matrix.

In some embodiments, a weighted directed interlayer coupling is provided if the entry corresponding to the target node in the activity array of its role is greater than zero.

Empty blocks of the supra-adjacency matrix can be assigned a salience equal to zero in some embodiments.

The one or more actions, in some embodiments, include at least one of (i) sequencing the plurality of nodes in the multilayer network, (ii) grouping the plurality of nodes in the multilayer network, (iii) constructing representations of the plurality of nodes in the multilayer network, (iv) embedding the plurality of nodes in the multilayer network, or (v) any combination of (i), (ii), (iii) and (iv).

In some embodiments, the selection and output of data corresponding to the one or more entities is automated.

In some embodiments, automated selection and output of data corresponding to the one or more entities from the context in which the data has been generated and stored based on entity relationships or node relationships with other entities or nodes is performed.

In yet other embodiments, the data is selected and locally stored within a computer automatically, thereby enabling access to the data via the computer.

In some embodiments, the data is selected and transmitted to a computer, thereby enabling access to the data by the computer.

BRIEF DESCRIPTION OF THE DRAWINGS

The features and advantages of the example embodiments of the invention presented herein will become more apparent from the detailed description set forth below when taken in conjunction with the following drawings.

FIG. 7 is a block structure of a supra-adjacency matrix including coupling saliences from which a random walk model is constructed in accordance with an example aspect of the present invention.

DETAILED DESCRIPTION

Generally, aspects of the present invention perform parametrized random walks on a collection of knowledge graphs (KGs). The framework generates and evaluates potential selections of items (e.g., thematic recommendations) based multilayer network representations of KGs. Each layer encodes different types of relationships in the KG, and interlayer couplings connect the same entity in different roles. The relative importance of different connections is captured by an intuitive salience matrix. It is learned from data or tuned to incorporate domain knowledge, address different use cases, or respect business logic.

Among other advantages, this mechanism complements collaborative filtering approaches because it enables thematic exploration and has the ability to incorporate new content without user data, which helps overcome the cold-start problem. In addition, it enables the exploitation of the full structure of the KG and maintains the distinction between the different types of connections.

In some embodiments, a KG is represented as a multilayer network where each layer contains one type of connection, and nodes that represent the same entity across layers are connected to each other through directed, weighted interlayer couplings. In turn, a rate matrix of a random walk on the multilayer network that incorporates a set of parameters encoding the a priori salience of each type of connection is constructed. These parameters enable comparing different types of connections to each other and greater control over the recommendations.

Figure 1:
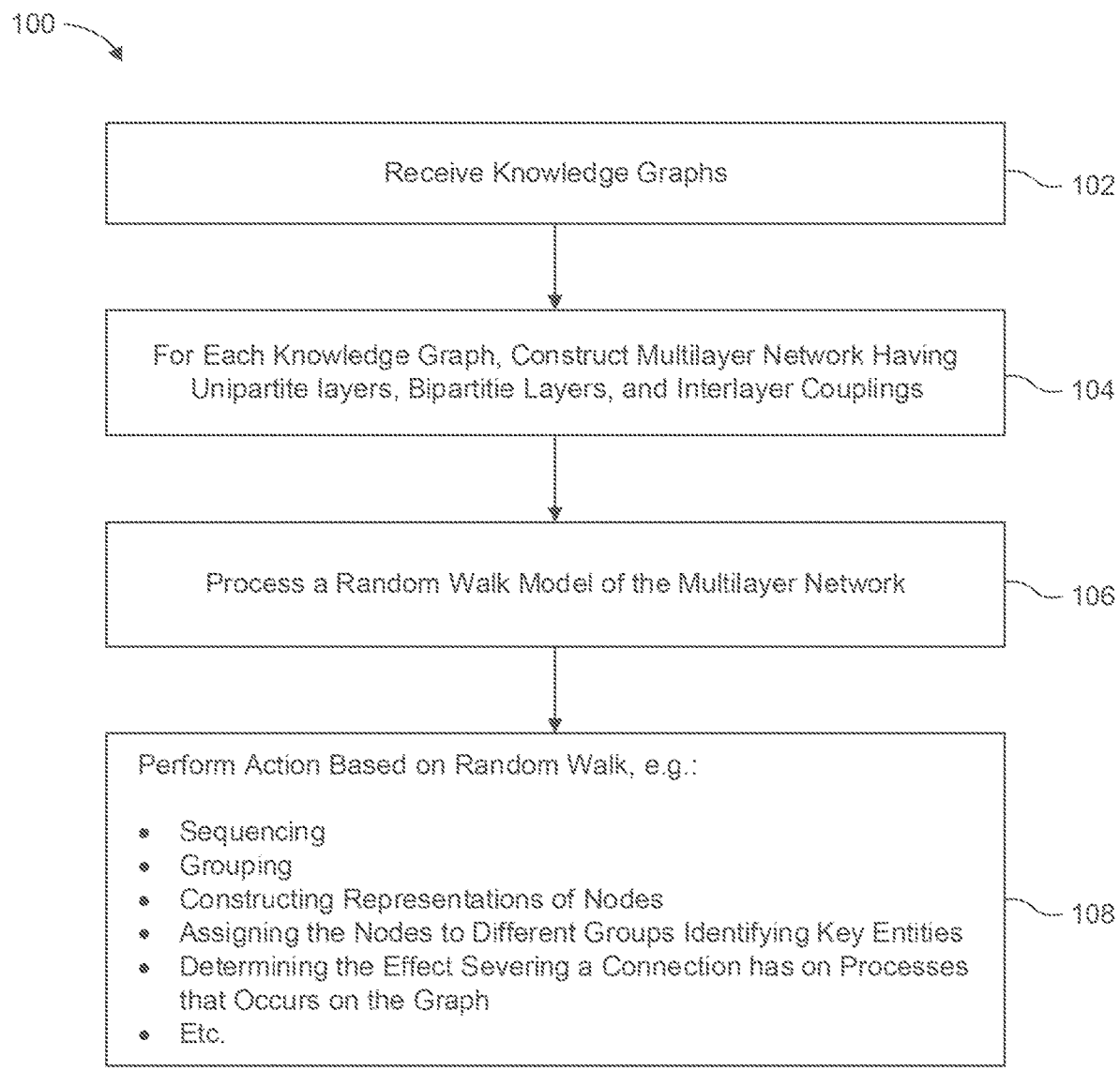
FIG. 1 depicts a flowchart of a process for performing parametrized random walks on a collection of knowledge graphs in accordance with an example aspect of the present invention.

FIG. 1 depicts a flowchart of a process 100 for performing parametrized random walks on a collection of knowledge graphs in accordance with an example aspect of the present invention. In an example embodiment, a system including a memory and one or more processors are provided. The memory stores instructions, which when executed by the one or more processors, cause the one or more processors to perform process 100. In step 102, the processor receives a plurality of knowledge graphs. For each knowledge graph the one or more processors construct a multilayer network having unipartite layers and bipartite layers and interlayer couplings, as shown in step 104. The unipartite and bipartite layers can be weighted or unweighted. The interlayer couplings (i) connect nodes of the unipartite layers and the bipartite layers representing the same entity (ii) are directed and (iii) are weighted with a weight that depends on an activity of a target node in the unipartite layer or bipartite layer in which the target node resides. In step 106, a random walk model of the multilayer network that takes into account saliencies of the different interlayer and intralayer connections of the nodes is processed. In an example implementation, the random walk model is processed by computing (e.g., extracting or analyzing) properties of the random walk model. For example, a property of the random walk model that can be exploited is its steady state. This is a proportion of the time that a walker would spend in each node in an infinitely-long random walk. The steady state can be computed directly from the random walk model.

In some embodiments, transients from a given initial condition can be processed. For example, if a random walk is commenced at a node i, the probability that the walk will be at node j after t units of time can be determined.

Properties of a random walk model that can be processed are not limited to the examples provided above. Other properties can be processed and still be within the scope of the invention. For example, a convergence rate of the random walk can be processed. The convergence rate relates to how quickly steady state is reached. So-called basins of attraction can be determined and processed as well (i.e., groups of nodes that once a walker visits it cannot escape).

In turn, at step 108, one or more actions are performed based on the random walk model. The one or more actions includes, for example, sequencing, grouping (e.g., clustering), and constructing representations of (e.g., embedding) the plurality of nodes in the multilayer network. In some embodiments, actions include assigning the nodes to different groups (e.g., community detection), identifying key entities (e.g., determining the most important ones), understanding the effect that severing a connection has on processes that occurs on the graph, and so on.

A random walk model is typically a set of probabilities representing, for any initial node and neighboring node, the likelihood of the neighboring node being chosen next by a process navigating the network. For any node n and a set of neighboring nodes $m_1\ m_2\ m_3\ \ldots$ to which n has an outgoing connection, the total sum of each of the individual probabilities added together according to the equation $\Sigma_i\ P(n \rightarrow m_i)$ is equal to one. A probability of zero between a node and its neighbor represents that the process will never travel to the neighbor from that particular node.

From the random walk model, there can be generated a (possibly infinite) sequence of nodes which represents a path being taken from the graph from some initial starting point, travelling to neighboring nodes according to their respective probabilities—such a sequence is referred to as the realization of a random walk. The random walks and random walk models according to the embodiments disclosed herein are useful for efficiently processing and making decisions about the identification and selection of network-based data.

Figure 2:
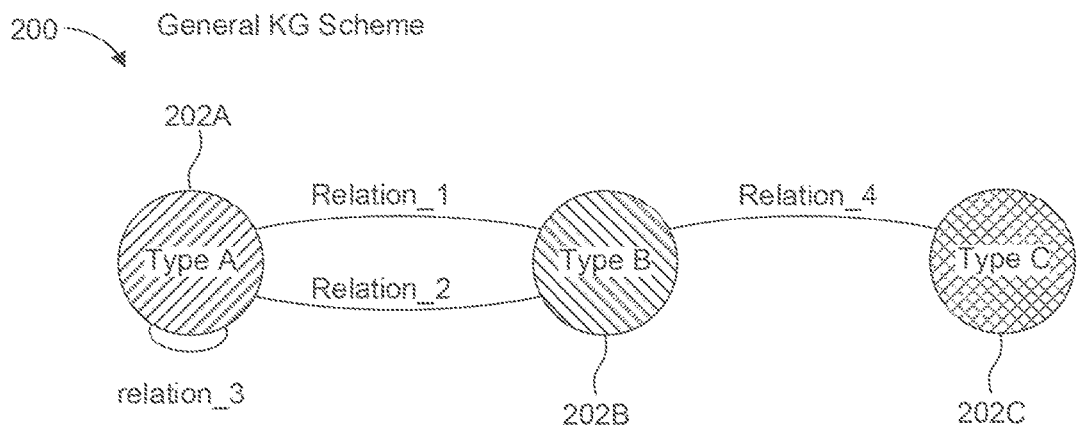
FIG. 2 depicts a general knowledge graph scheme in accordance with an example aspect of the present invention.

FIG. 2 depicts a general knowledge graph scheme 200 (also referred to as monolayer network 200) in accordance with an example aspect of the present invention. With reference to both FIGS. 1 and 2, in an example embodiment, a computer-implemented method performs receiving a plurality of knowledge graphs (FIG. 1, step 102). In this embodiment, each knowledge graph has a plurality of entities, entity 202A, entity 202B, and entity 202C (hereinafter individually and collectively are referred to as entity 202 or entities 202, correspondingly). It should be understood that the entities 202 do not represent any one entity, but all entities of the type that can exist. Likewise, the connections do not represent any specific connections, but indicate what connections may exist and a collection of types of labeled connections. The connections are depicted in FIG. 2 as Relation_1, Relation_2, Relation_3, and Relation 4. The connections represent the relationships of the plurality of entities, where each labeled connection is weighted or unweighted, and each entity has: (i) an entity type (e.g., Type A, Type B, Type C in FIG. 2) and (ii) a set of connections with other entities in the knowledge graph (e.g., see FIG. 2, showing the entity of Type A 202A having two types of connections (e.g., Relation_1 and Relation_2) with the another entity of Type B 202B and a third type of connection to itself (Relation_3), and entity of Type B 202B having one connection type of connections (Relation_4) with an entity of Type C 202C). It should be understood that there can be additional entity types (e.g., Type N) and additional types of connections (e.g., Relation_n).

Figure 3:
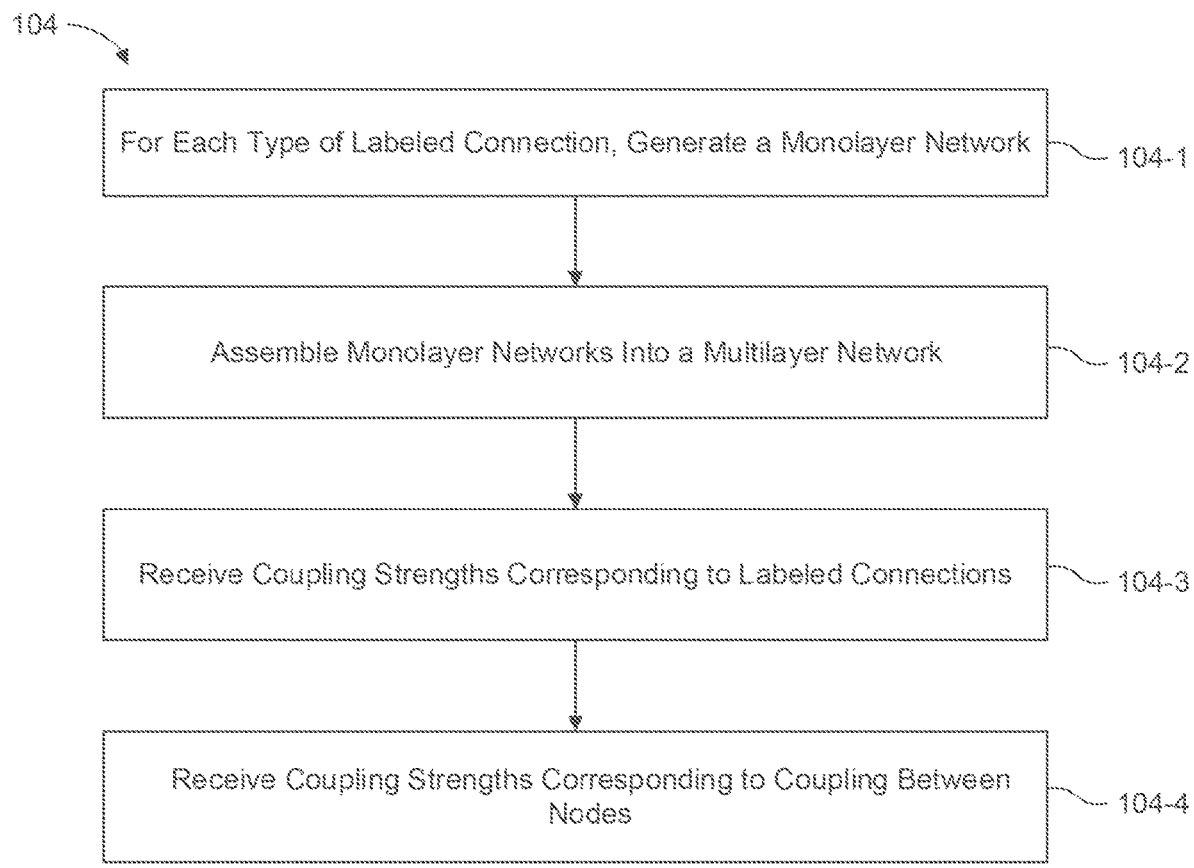
FIG. 3 depicts a flowchart of a process for constructing a multilayer network in accordance with an example aspect of the present invention.
Figure 4:
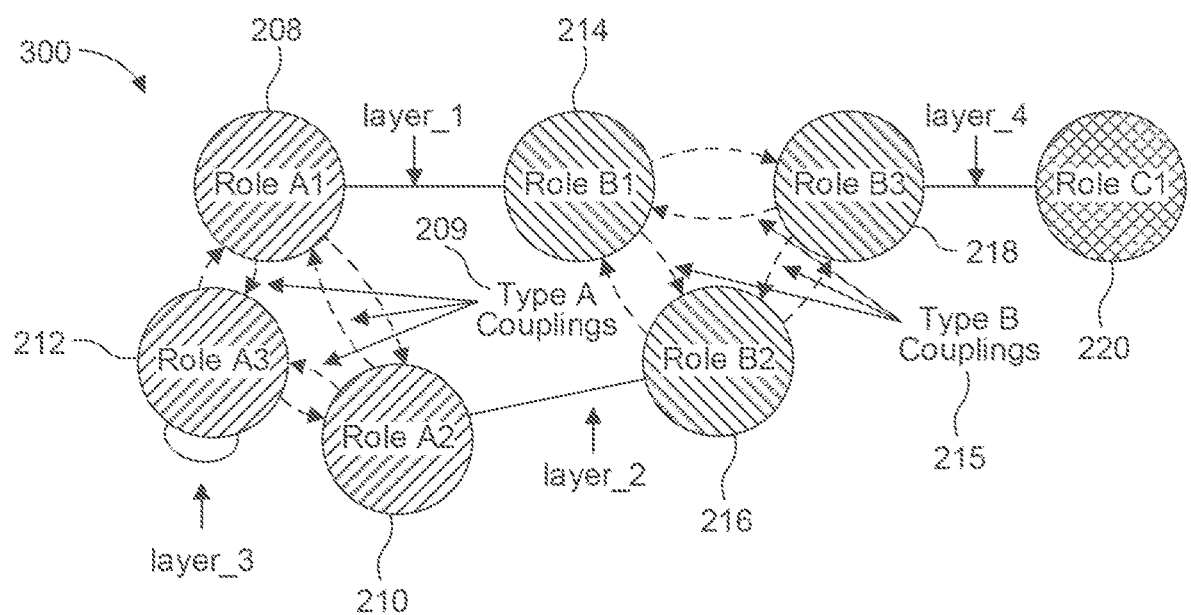
FIG. 4 depicts a multilayer model of a knowledge graph in accordance with an example aspect of the present invention.

FIG. 3 illustrates an example process for constructing the multilayer network described above in connection with step 104 of FIG. 1. FIG. 4 depicts a multilayer model 300 of a knowledge graph in accordance with an example aspect of the present invention. Referring to FIGS. 2, 3 and 4, in step 104-1, for each type of labeled connection, a monolayer network is generated (e.g., monolayer network 200 depicted in FIG. 2) where each entity of the entity types (Type A 202A, Type B 202B, and Type C 202C of FIG. 2) connected by the labeled connection (Relation_1, Relation_2, Relation_3, Relation_4 of FIG. 2) is represented by a node, thereby generating a plurality of monolayer networks.

In step 104-2, the plurality of monolayer networks are assembled into a multilayer network 300 (FIG. 4), where each layer (layer_1, layer_2, layer_3, layer_4 of FIG. 4) of the multilayer network corresponds to one of the plurality of monolayer networks, where two or more nodes in the multilayer network that represent the same entity are linked by an interlayer coupling (e.g., Type A coupling 209, Type B coupling 215 of FIG. 4).

In step 104-3, a first plurality of coupling strengths are received. Each first coupling strength corresponds to one of the labeled connections (i.e., each labeled connection represents a relationship between entities in a monolayer network). In step 104-4, a second plurality of coupling strengths are received. Each second coupling strength corresponds to the coupling between nodes across layers of the multilayer network that represent the same entity (i.e., the interlayer couplings).

Figure 5:
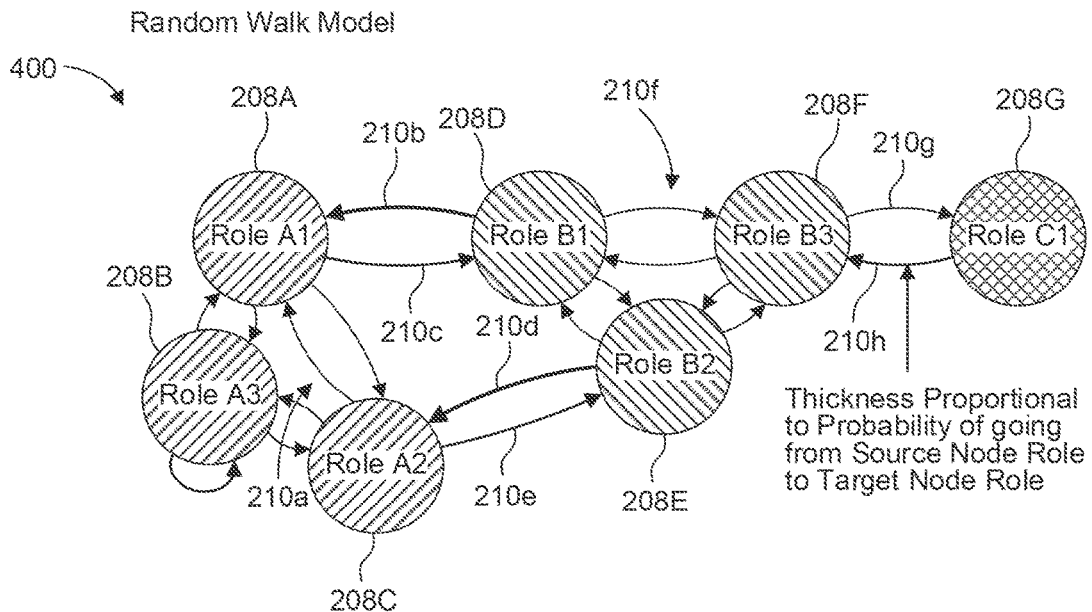
FIG. 5 depicts a random walk model in accordance with an example aspect of the present invention.

As described above with respect to FIG. 1, in step 106, a random walk model of the multilayer network that takes into account saliencies of the different interlayer and intralayer connections of the nodes is processed. FIG. 5 depicts a random walk model 400 in accordance with an example aspect of the present invention. The plurality of nodes (node 208A, node 208B, node 208C, node 208D, node 208E, node 208F, node 208G; individually and collectively sometimes referred to simply as node 208, correspondingly) has a predetermined role (Role A1, Role A2, Role A3, Role B1, Role B2, Role B3, Role C1). In some embodiments, the random walk model 400 on the multilayer network is constructed such that a probability of visiting a first node (also referred to as a Target Node) of the plurality of nodes from a second node (also referred to a Source Node) of the plurality of nodes is proportional to (i) the weight of the labeled connection between the first node and the second node divided by the sum of all the weights of the connections that originate from the second node multiplied by the first coupling strength of the corresponding labeled connection, or (ii) the second coupling strength of the coupling between the nodes across layers of the multilayer network that represent the same entity. In FIG. 5, the weights are represented as different thicknesses (e.g., weight 210a, weight 210b, weight 210c, weight 210d, weight 210e, weight 210f, weight 210g; individually and collectively referred to sometimes as weight 210, correspondingly). It should be understood that the thicknesses (i.e., weights 210) illustrated in FIG. 5 are exemplary and that the weights representing the strength of a coupling between nodes can be the same or different.

As described above with respect to step 108 of FIG. 1, one or more actions are performed based on the random walk model. This enables the system to perform one or more actions such as sequencing the plurality of nodes in the multilayer network, clustering the plurality of nodes in the multilayer network, embedding the plurality of nodes in the multilayer network or any combination of the foregoing. In some embodiments, actions include assigning the nodes to different groups (e.g., community detection), identifying key entities (e.g., the entities deemed the most important ones), understanding the effect that severing a connection would have on processes that occur on the graph, and so on.

In yet another embodiment of a system and method that performs random walks on knowledge graphs, each knowledge graph has (i) a plurality of entities, where each entity has an entity type and (ii) a plurality of labeled connections representing the relationships of the plurality of entities.

Each labeled connection has (i) a label and (ii) a pair of specified entity types including a first entity type and a second entity type.

Each knowledge graph also connects a plurality of pairs of entities of the specified entity types. Each knowledge graph also is weighted (e.g., real numbers that describe the intensity of the connection) or unweighted.

In this example embodiment, for each entity type, there is generated a unique ordering of all the entities belonging to that entity type.

In addition, for each labeled connection there is generated a monolayer network, where each entity of the specified entity types is represented by a node, where a labeled connection having a distinct pair of specified entity types is a bipartite monolayer network, and a labeled connection having a non-distinct pair of specified entity types is a unipartite monolayer network. This generates a plurality of monolayer networks.

For each labeled connection there is also generated an adjacency matrix for each monolayer network. Each adjacency matrix for each monolayer network has: a number of columns (i) equal to the number of entities of the first entity type and (ii) each column representing an entity of the first entity type in the unique ordering of the entities. The adjacency matrix for each monolayer network also has a number of rows (i) equal to the number of entities of the second entity type and (ii) each row representing an entity of the second entity type in the unique ordering of the entities. Each entry of the adjacency matrix has (i) a zero value if the entities represented by the column and row do not have a connection of the labeled connection and (ii) a non-zero value if the entities represented by the column and row do have a connection of the labeled connection, the non-zero value corresponding to the weight of the connection if the monolayer network is weighted and one (1) if the connection of the labeled connection is an unweighted connection For each labeled connection, there is also generated one role for each of the specified entity types, wherein all entities of that entity type inherit the role. For each labeled connection, there is also generated an activity array for each role, the activity array having a length equal to the number of entities of each distinct specified entity type, where the position of the entity in the activity array corresponds to the position of the entity in the unique ordering of the entities of the entity type, where the value of each entry in the activity array corresponds to a function of a degree or weighted degree in the monolayer network associated to the role (e.g., total minutes on screen, revenue of film, ratings).

Figure 6:
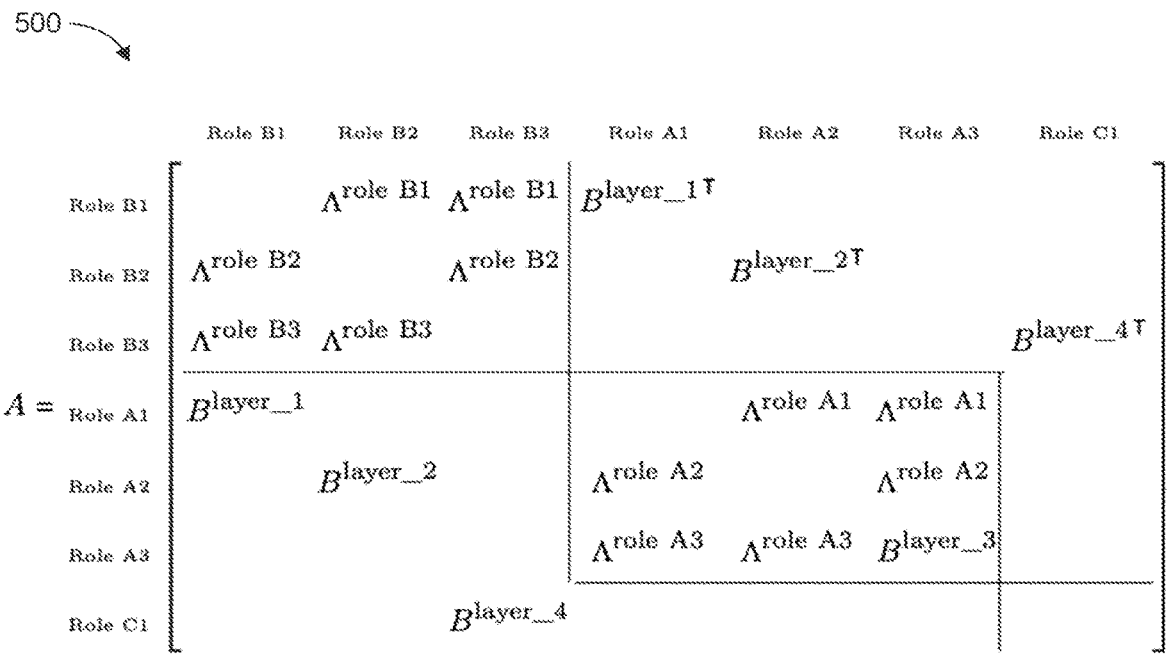
FIG. 6 is a block structure of a supra-adjacency matrix of a multilayer network in accordance with an example aspect of the present invention.

FIG. 6 is a block structure of a supra-adjacency matrix of a multilayer network 500 in accordance with an example aspect of the present invention. FIG. 7 is a block structure of a supra-adjacency matrix including coupling saliences 600 from which a random walk model is constructed in accordance with an example aspect of the present invention.

For each labeled connection there is also generated a coupling matrix (e.g., represented as lambda (Λ) in FIGS. 6 and 7), for every role (Role B1, Role B2, Role B3, Role A1, Role A2, Role A3, Role C1), having a number of columns and a number of rows equal to the number of entities of the entity type, each column and row representing each entity in the same ordering as the unique ordering as in the activity array and containing in a main diagonal of the coupling matrix the activity array corresponding to the role and zeros everywhere else. In addition the method of this embodiment generates, for a subset of the plurality of monolayer networks: a multilayer network wherein, each layer (layer_1, layer_2, layer_3, layer_4) of the multilayer network corresponds to the monolayer network of each of the labeled connections in the subset of the monolayer networks of labeled connections, wherein nodes that represent the same entity in different layers of the multilayer network are connected to each other, a supra-adjacency matrix of the multilayer network 500 having (as depicted in FIG. 6) (i) a block structure determined by the roles that appear in the subset of the plurality of monolayer networks, and (ii) an equal number of columns and row blocks, (iii) one block for each role, each of the blocks having a size equal to the number of entities of the entity type associated to the role (see example in the equation in of the supra-adjacency matrix of the multilayer network 500). Each role in the block-columns of the supra-adjacency matrix is a source-role, and each role in the block-rows of the supra-adjacency matrix is a target-role, where: (i) the adjacency matrices of the unipartite monolayer networks from the labeled connections between entities of the same entity type are placed on the block of the supra-adjacency matrix corresponding to the intersection of the block column and block row corresponding to the same role, (ii) the adjacency matrices of the bipartite monolayer networks from the labeled connections between entities of different entity types are placed on two locations of the supra-adjacency matrix including: (A) one in the block column of a first role and block row of a second role (these are the $B^{layer\_1}, \ldots, B^{layer\_2}, \ldots, B^{layer\_n}$ matrices depicted in FIGS. 6 and 7), and (B) transposed in the block column of the second role and the block row of the first role (these are the $B^{layer\_1T}, \ldots, B^{layer\_2T}, \ldots, B^{layer\_nT}$ matrices depicted in FIGS. 6 and 7, where superscript T denotes matrix transposition), (iii) a plurality of weighted directed interlayer couplings between all nodes that represent the same entity in different roles, each weighted directed interlayer coupling being represented, for every ordered pair of roles that belong to the same entity type in the supra-adjacency matrix by the coupling matrix (the Λ) of a target role that is placed in the block column of a source role and the block row of the target role.

The method of this embodiment also receives a plurality of coupling saliences (non-negative, real numbers), each of the coupling saliences corresponding to a non-empty block of the supra-adjacency matrix. In some embodiments, these saliences can be matrices of the same size as the blocks, where each entry in the matrix is the salience of each individual connection. This is useful if, for example, where the entities are persons, a particular person (e.g., a celebrity) is better known as an actor than a director, and the like. In turn, the method constructs a random walk model on the multilayer network, and then performs one or more actions based on the random walk model.

The one or more actions includes sequencing, grouping (e.g., clustering), and constructing representations of (e.g., embedding) the plurality of nodes in the multilayer network. In some embodiments, actions include assigning the nodes to different groups (e.g., community detection), identifying key entities (e.g., the most important ones), understand the effect that severing a connection would have on processes that occur on the graph, and so on.

The performance of the one or more actions enables enhanced and automated selection and output of the data corresponding to the one or more entities (e.g. people, places, and things) from the context in which the data has been generated and stored by virtue of the entity or node relationships with other entities or nodes. This means that data which is selected and output according to the processes described herein are of enhanced contextual relevance and in this regard can be automatically selected and output at significantly improved rates, for example the throughput of data selection to its output, or speed of data selection is significantly enhanced. The data which is automatically selected and output according to the processes described herein can thus be pre-emptively obtained and stored locally within a computer, or transmitted to the computer, such that the selected data is immediately accessible and relevant to a local user of the computer.

In some embodiments, the pair of specified entity types can be the same entity types or distinct entity types.

In some embodiments, the value of each entry in the activity array corresponds to (i) an in-degree or out-degree, (ii) the weighted degree, or (iii) a combination of (i) and (ii).

In some embodiments, a weighted directed interlayer coupling exists if the entry corresponding to the target node in the activity array of its role is greater than zero.

In some embodiments, a probability of visiting a second node (e.g., equivalent to role) of the plurality of nodes from a first node of the plurality of nodes is equal to an entry in the supra-adjacency matrix having a column number of the supra-adjacency matrix corresponding to the first node and a row number of the supra-adjacency matrix corresponding to the second node (which determines the salience of the connection) multiplied by the salience of the entry and divided by the sum of all the entries of the sum of all the entries of the column corresponding to the first node, each entry of the column multiplied by its corresponding salience, thereby constructing a rate matrix of a random walk on the supra-adjacency matrix.

In an example implementation, there is provided a system including a memory storing instructions, which when executed by one or more processors, cause the one or more processors to perform the above-described computer-implemented method.

In some embodiments, empty blocks of the supra-adjacency matrix are assigned a salience equal to zero.

Figure 8:
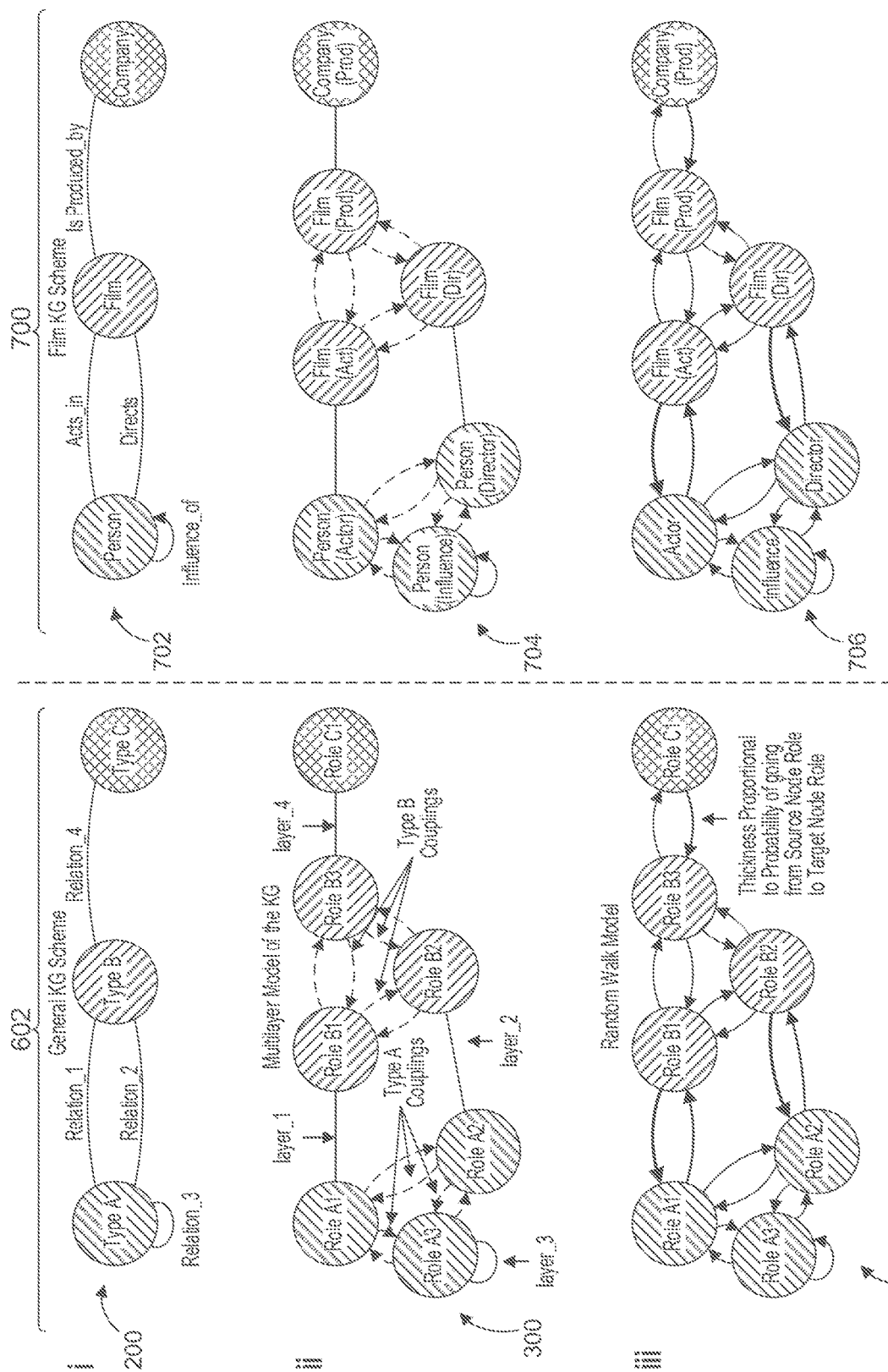
FIG. 8 illustrates example implementations of a knowledge graph, a multilayer model of the knowledge graph and a random walk model, according to example aspects of the present invention.
Figure 8:
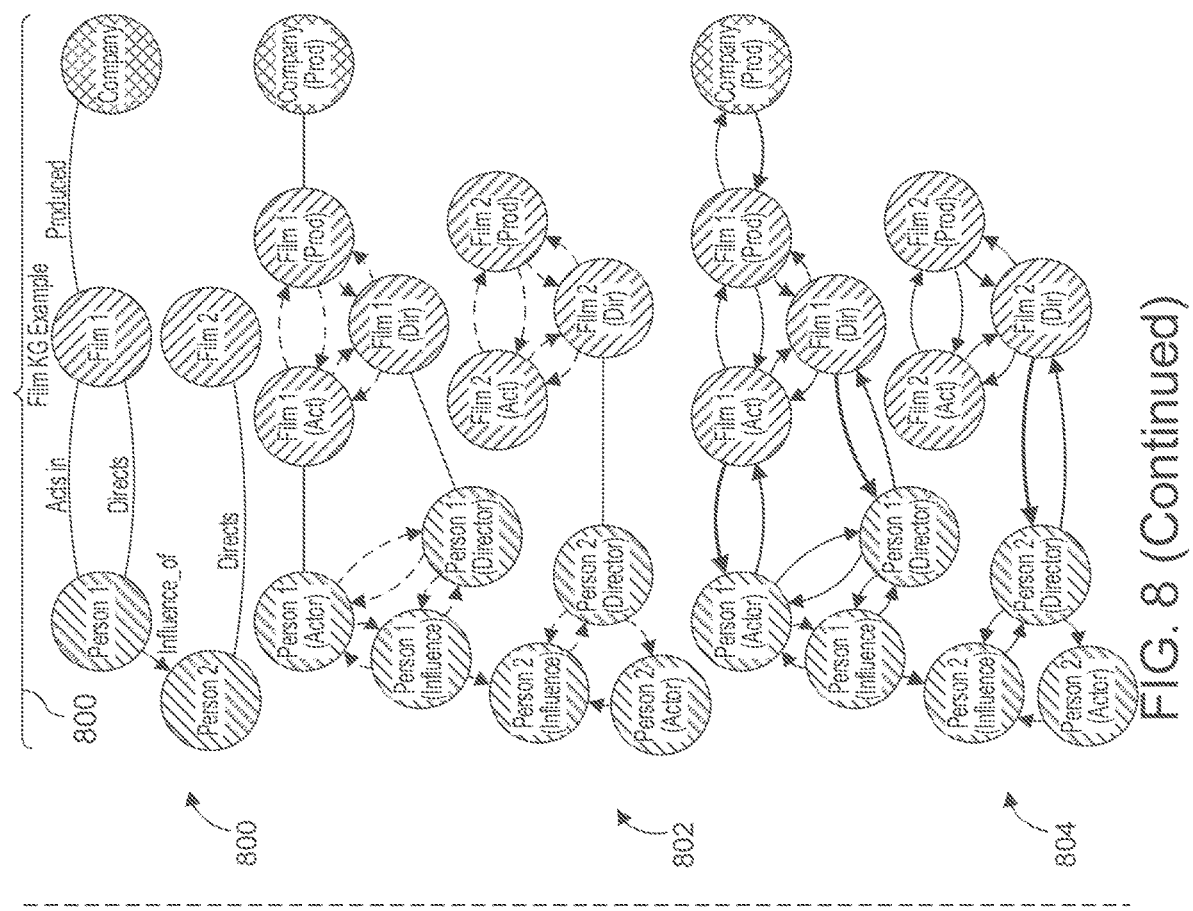

FIG. 8 illustrates example implementations of a knowledge graph, a multilayer model of the knowledge graph and a random walk model, according to example aspects of the present invention. In this example implementation, aspects of the present invention are applied on a number of KGs of the film industry constructed from, for example, a database data such as The Movie Database (tMDB) data.

In this example implementation, column 602 illustrates (i) a general schematic of a KG 200 with three types of nodes, and four types of relations, as described above in connection with FIG. 2, (ii) a multilayer network representation of the KG 300, as described above in connection with FIG. 4, and (iii) a random walk model on the multilayer representation of the KG 400. as described above in connection with FIG. 5. With respect to the multilayer network representation of the KG 300, each layer corresponds to a type of relation in the KG (solid lines). Unipartite layers contain interactions among a single node role, and bipartite layers contain interactions between two mode roles. Node roles of the same type that represent the same entity are coupled to each other (dashed lines). With respect to the random walk model on the multilayer representation of the KG 400, as escribed above, the width of each directed connection corresponds to its salience in a matrix (e.g., matrix a in FIG. 7).

Column 700 depicts a schematic of a film KG 702 with three types of nodes (person, film, company), and four types of relations (acting, directing, influence and producing). In the multilayer representation of the KG 704 there are three roles for each person node (director, actor, influence), three roles for films (one for each of its interactions with actors, directors and companies), and one role for companies. An example random walk model on the multilayer representation of the KG 706 is also shown in column 700. Column 800 illustrates a concrete example of a film KG 802 having multiple persons, films, companies, its multilayer representation 804, and a corresponding random walk model 806, in accordance with an example implementation of the present invention.

The example embodiments described herein may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general purpose digital computers or similar devices.

From a hardware standpoint, a CPU typically includes one or more components, such as one or more microprocessors, for performing the arithmetic and/or logical operations required for program execution, and storage media, such as one or more memory cards (e.g., flash memory) for program and data storage, and a random access memory, for temporary data and program instruction storage From a software standpoint, a CPU typically includes software resident on a storage media (e.g., a memory card), which, when executed, directs the CPU in performing transmission and reception functions. The CPU software may run on an operating system stored on the storage media, such as, for example, UNIX or Windows, iOS, Linux, and the like, and can adhere to various protocols such as the Ethernet, ATM, TCP/IP protocols and/or other connection or connectionless protocols. As is well known in the art, CPUs can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

A CPU may be a single CPU, or may include plural separate CPUs, wherein each is dedicated to a separate application, such as, for example, a data application, a voice application, and a video application. Software embodiments of the example embodiments presented herein may be provided as a computer program product, or software, that may include an article of manufacture on a machine accessible or non-transitory computer-readable medium (i.e., also referred to as "machine readable medium") having instructions. The instructions on the machine accessible or machine readable medium may be used to program a computer system or other electronic device. The machine-readable medium may include, but is not limited to, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" and "computer-readable medium" used herein shall include any non-transitory medium that is capable of storing, encoding, or transmitting a sequence of instructions for execution by the machine (e.g., a CPU or other type of processing device) and that cause the machine to perform any one of the methods described herein, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 9:
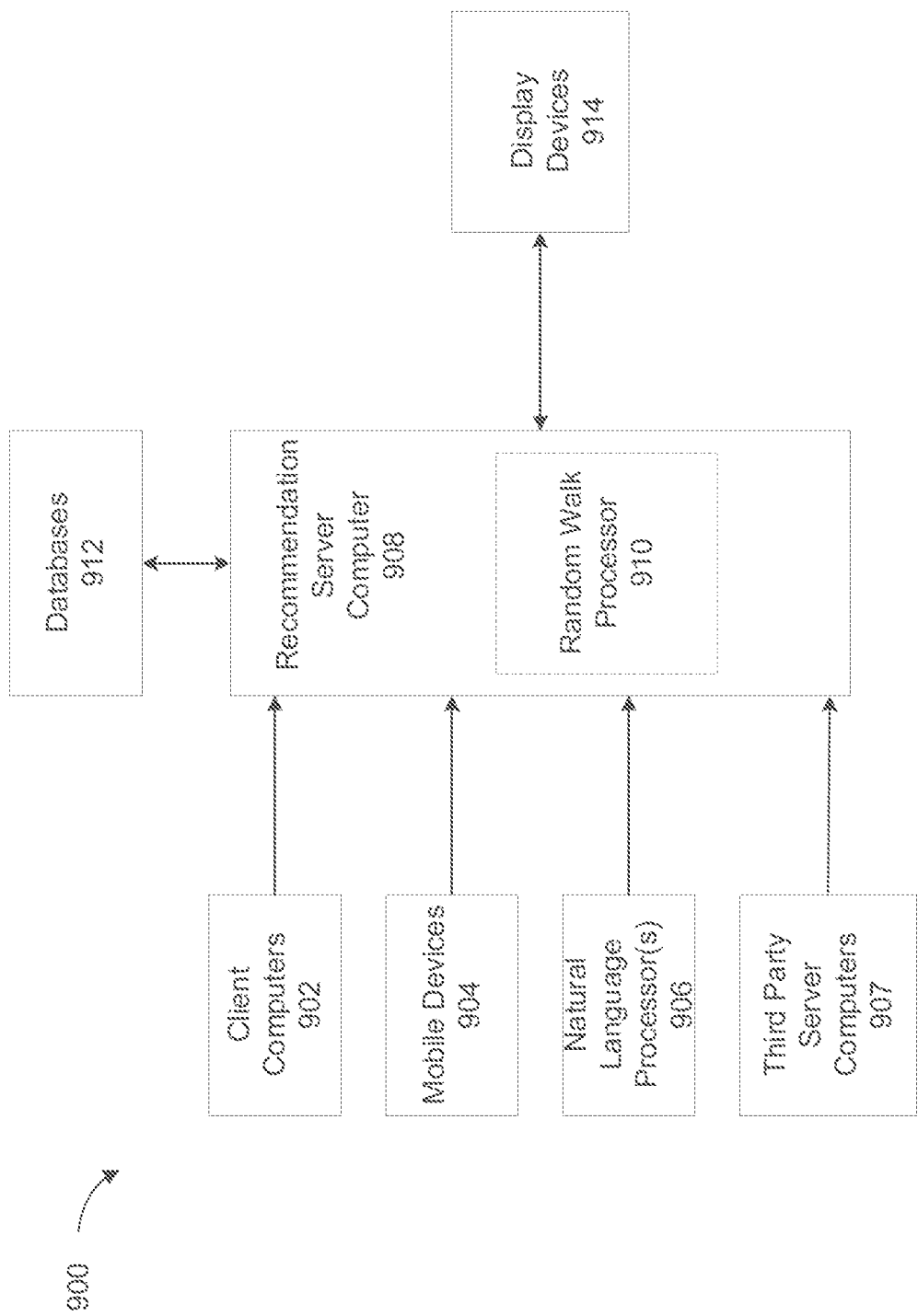
FIG. 9 illustrates an example recommendation system in accordance with the example embodiments described herein.

FIG. 9 shows an example recommendation system 900 in accordance with the example embodiments described herein. The example system 900 includes client computers 902, mobile devices 904, natural language processor(s) (NLP(s)) 906, third party server computers 907, a recommendation server computer 908, databases 912 and display devices 914. The recommendation server computer 908, in this example a server computer at a media content provider, also includes a random walk processor 910.

The example client computers 902 can include desktop computers or laptop computers that a user can use to access the recommendation server computer 108. One or more client computers 902 can be used and the client computers 902 can be at different geographical locations. Access to the recommendation server computer 908 is via an Internet connection.

The example mobile devices 904 can include smartphones, tablet computers or any similar wireless device. One or more mobile devices 904 can be used. Access to the recommendation server computer 908 is via a wireless Internet connection.

The example NLPs 906 can include scanners that convert information obtained from the Web, for example blog, news, or information websites containing notes relating to actors, films and companies (e.g., production companies), into electronic text formatted in a manner that can be input into the recommendation server computer 908 for further processing. The NLPs 906 can also include converters that can convert voice recordings from podcasts and shows into electronic text.

The example third party server computers 907 are server computers from third parties such as, data collections services, social media and text messaging. Information can be sent from the third party server computers expressing opinions regarding a particular person, (e.g., celebrity, actor, director), production company, movie, etc. and other opinions and data. The information and data sent from the third party server computers 907 to the recommendation server computer 908 can supplement information received from the other sources mentioned.

In some embodiments, the recommendation server computer 908 is a server computer at a media content provider (e.g., a streaming media content service that provides media content such as music, movies podcasts, games, news, and the like). The recommendation server computer 908 can process communications from client computers 902, from mobile devices 904, from NLP(S) 906 and from third party server computers 907. The recommendation server computer 908 also can process and store information such as user listening or viewing histories and other types of information.

The recommendation server computer 908 includes the random walk processor 910. The random walk processor 910 processes information from a plurality of sources and derives objects and functions from the information according to the methods described herein.

Databases 912 include one or more databases that store data about the entities. For example, as described above, the database can be a database containing information about the film industry.

Display devices 914 include one or more display devices for displaying the relationship data and recommendations obtained by using the above-described methods. The display devices may include both two-dimensional display devices and three-dimensional display devices.

The systems and methods of the present disclosure can be also applied to scenarios other than for media content services. In a generic case, the recommendation server computer 108 can be referred to as a server computer 908 and the random walk processor 910 can be referred to as a data processing engine 910.

Figure 10:
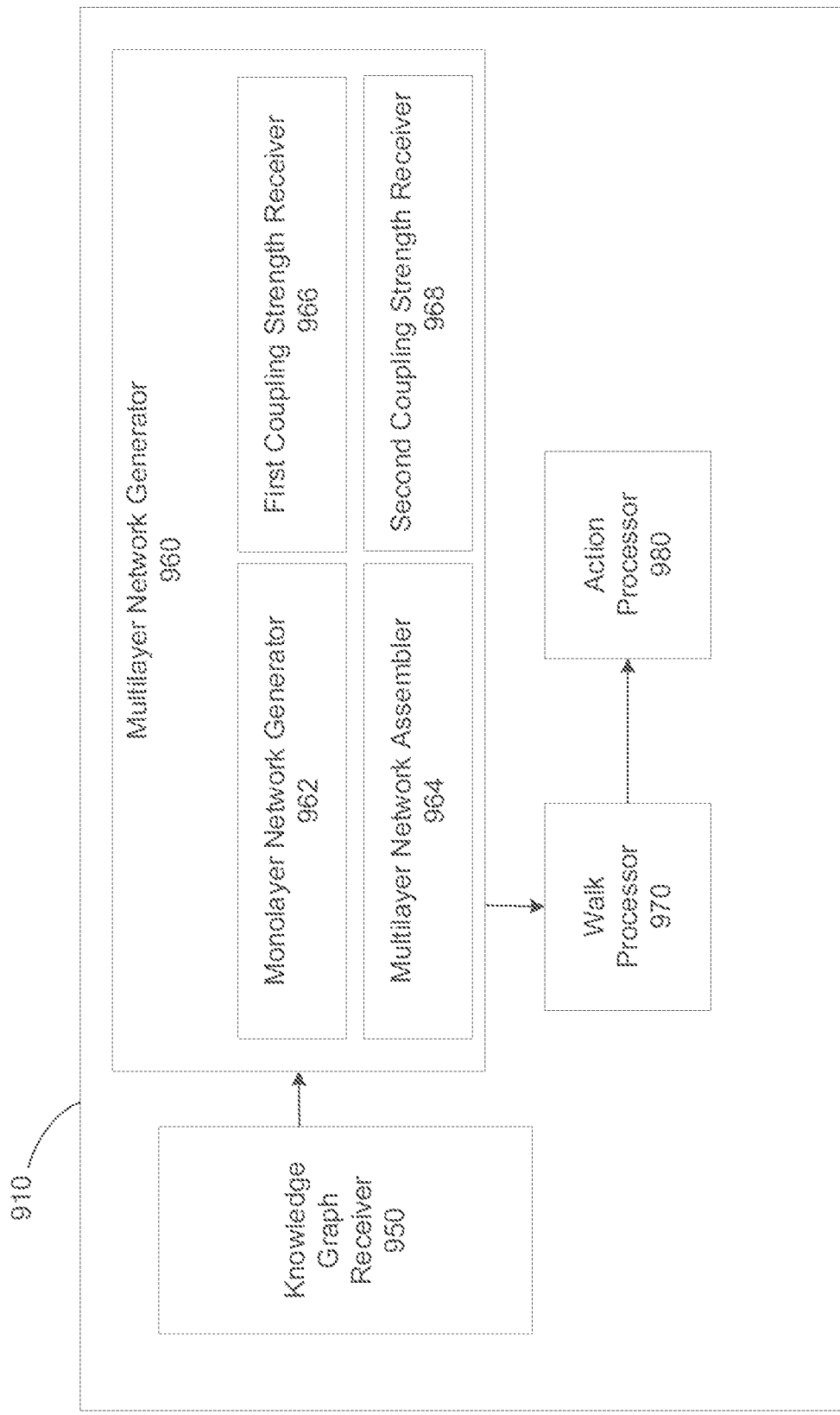
FIG. 10 illustrates example modules of a random walk processor of FIG. 9.

FIG. 10 shows example modules of a random walk processor 910 of FIG. 9. The random walk processor 910 includes an a knowledge graph receiver 950, a multilayer network generator 960, a walk processor 970, and an action processor. The knowledge graph receiver 950 is constructed to receive a plurality of knowledge graphs. The multilayer network generator is constructed to, for each knowledge graph the one or more processors construct a multilayer network having unipartite layers and bipartite layers and interlayer couplings. As explained above, the unipartite and bipartite layers can be weighted or unweighted. In addition, the interlayer couplings (i) connect nodes of the unipartite layers and the bipartite layers representing the same entity (ii) are directed and (iii) are weighted with a weight that depends on an activity of a target node in the unipartite layer or bipartite layer in which the target node resides. The walk processor 970 is constructed to process a random walk model of the multilayer network that takes into account saliencies of the different interlayer and intralayer connections of the nodes. The action processor 980 is constructed to perform one or more actions based on the random walk model. The one or more actions includes sequencing, grouping (e.g., clustering), and constructing representations of (e.g., embedding) the plurality of nodes in the multilayer network. In some embodiments, actions include assigning the nodes to different groups (e.g., community detection), identifying key entities (e.g., the most important ones), understanding the effect that severing a connection has on processes that occurs on the graph, and so on.

The multilayer network generator 960 includes a monolayer network generator 962, a multilayer network assembler 964, a first coupling strength receiver 966, and a second coupling strength receiver 968. Monolayer network generator 962 is constructed to, for each type of labeled connection, generate a monolayer network. Multilayer network assembler 964 is constructed to assemble the plurality of monolayer networks generated by monolayer network generator 962 into a multilayer network, where each layer (e.g., layer_1, layer_2, layer_3, layer_4 of FIG. 4) of the multilayer network corresponds to one of the plurality of monolayer networks, where two or more nodes in the multilayer network that represent the same entity are linked by an interlayer coupling (e.g., Type A coupling 209, Type B coupling 215 of FIG. 4).

First coupling strength receiver 966 is constructed to receiver a first plurality of coupling strengths. Each first coupling strength corresponds to one of the labeled connections (i.e., each labeled connection represents a relationship between entities in a monolayer network generated by monolayer network generator 962). Second coupling strength receiver 968 is constructed to receive a second plurality of coupling strengths. Each second coupling strength corresponds to the coupling between nodes across layers of the multilayer network that represent the same entity (i.e., the interlayer couplings).

In addition, not all of the components are required to practice the invention, and variations in the arrangement and type of the components may be made without departing from the spirit or scope of the invention. As used herein, the term "component" or "engine" is applied to describe a specific structure for performing specific associated functions, such as a special purpose computer as programmed to perform algorithms (e.g., processes) disclosed herein. The component can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-10 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

The invention claimed is:

1. A system for performing random walks on knowledge graphs, comprising:
a memory; and
one or more processors to:
receive a plurality of knowledge graphs; and
for each knowledge graph:
construct a multilayer network having:
unipartite layers, wherein the unipartite layers comprise connections that originate from and terminate at the same node;
bipartite layers, wherein the bipartite layers comprise connections that originate from and terminate at different nodes; and
interlayer connections that:
(i) connect nodes of the unipartite layers and the bipartite layers that represent the same entity;
(ii) are directed; and
(iii) are weighted with a weight that depends on an activity of a target node in the unipartite layer or the bipartite layer in which the target node resides;
process a random walk model of the multilayer network that takes into account saliencies of the interlayer connections and intralayer connections of the nodes; and
provide one or more media content recommendations based on the random walk model.

2. A system for performing random walks on knowledge graphs, comprising:
a memory; and
one or more processors to:
receive a plurality of knowledge graphs, each knowledge graph having a plurality of entities and a collection of types of labeled connections representing the relationships of the plurality of entities, each labeled connection being weighted or unweighted and each entity having:
(i) an entity type; and
(ii) a set of connections with other entities in the knowledge graph;
generate, for each type of labeled connection, a monolayer network, wherein each entity of the entity types connected by the labeled connection is represented by a node, thereby generating a plurality of monolayer networks;
assemble the plurality of monolayer networks into a multilayer network, wherein each layer of the multilayer network corresponds to one of the plurality of monolayer networks, wherein two or more nodes that represent the same entity are linked by an interlayer connection;
receive a first plurality of coupling strengths, each of the first coupling strengths corresponding to one of the labeled connections;
receive a second plurality of coupling strengths, each second coupling strength corresponding to the connections between nodes across layers of the multilayer network that represent the same entity;
construct a random walk model on the multilayer network, wherein a probability of visiting a first node of the plurality of nodes from a second node of the plurality of nodes is proportional to:
(i) the weight of the labeled connection between the first node and the second node divided by the sum of all the weights of the connections that originate from the second node and multiplied by the first coupling strength of the corresponding labeled connection; or
(ii) the second coupling strength of the connection between the nodes across layers of the multilayer network that represent the same entity; and
provide one or more media content recommendations based on the random walk model.

3. The system according to claim 1, wherein an entity has one or more roles, and wherein each role represents a function performable, by the entity, with respect to connected entities.

4. The system according to claim 1, wherein each labeled connection also has a temporal attribute.

5. The system according to claim 1, wherein providing the one or more media content recommendations comprises:
(i) sequencing the plurality of nodes in the multilayer network;
(ii) grouping the plurality of nodes in the multilayer network;
(iii) constructing representations of the plurality of nodes in the multilayer network;
(iv) embedding the plurality of nodes in the multilayer network; or
(v) any combination of (i), (ii), (iii) and (iv).

6. The system according to claim 1, wherein the one or more processors further perform:
automated selection and output of data corresponding to the one or more entities.

7. The system according to claim 1, wherein the one or more processors further perform:
automated selection and output of data corresponding to the one or more entities from the context in which the data has been generated and stored based on entity relationships or node relationships with other entities or nodes.

8. The system according to claim 1, wherein the one or more processors further:
automatically select the data and cause the data to be locally stored within a computer, thereby enabling access to the data via the computer.

9. The system according to claim 1, wherein the one or more processors further:
automatically select the data and transmit the data to a computer, thereby enabling access to the data by the computer.

10. The system according to claim 2, wherein an entity can have one or more roles, and wherein each role represents a function performable, by the entity, with respect to connected entities.

11. The system according to claim 2, wherein a probability of visiting a second node of the plurality of nodes from a first node of the plurality of nodes is equal to an entry in the supra-adjacency matrix having a column number of the supra-adjacency matrix corresponding to the first node and a row number of the supra-adjacency matrix corresponding to the second node multiplied by the salience of the entry and divided by the sum of all the entries of the sum of all the entries of the column corresponding to the first node, each entry of the column multiplied by its corresponding salience, thereby constructing a rate matrix of a random walk on the supra-adjacency matrix.

12. A system for performing random walks on knowledge graphs, comprising:
a memory; and
one or more processors to:

(A) receive a plurality of knowledge graphs, each knowledge graph;
  (x) having:
    (i) a plurality of entities, each entity having an entity type; and
    (ii) a plurality of labeled connections representing the relationships of the plurality of entities, each labeled connection having:
      (i) a label; and
      (ii) a pair of specified entity types including a first entity type and a second entity type;
  (y) connecting a plurality of pairs of entities of the specified entity types; and
  (z) being weighted or unweighted;
(B) generate, for each entity type, a unique ordering of all the entities belonging to that entity type;
(C) generate, for each labeled connection;
  (1) a monolayer network, wherein each entity of the specified entity types is represented by a node, and wherein a labeled connection having a distinct pair of specified entity types is a bipartite monolayer network and a labeled connection having a non-distinct pair of specified entity types is a unipartite monolayer network, thereby generating a plurality of monolayer networks;
  (2) an adjacency matrix for each monolayer network having:
    a number of columns:
      (i) equal to the number of entities of the first entity type; and
      (ii) each column representing an entity of the first entity type in the unique ordering of the entities; and
    a number of rows:
      (i) equal to the number of entities of the second entity type; and
      (ii) each row representing an entity of the second entity type in the unique ordering of the entities,
    wherein each entry of the adjacency matrix has;
      (i) a zero value if the entities represented by the column and row do not have a connection of the labeled connection; and
      (ii) a non-zero value if the entities represented by the column and row do have a connection of the labeled connection, the non-zero value corresponding to the weight of the connection if the monolayer network is weighted and one (1) if the connection of the labeled connection is an unweighted connection;
  (3) one role for each of the specified entity types, wherein each role represents a function performable, by the entity, with respect to connected entities, and wherein all entities of that entity type inherit the role;
  (4) an activity array for each role, the activity array having a length equal to the number of entities of each distinct specified entity type, wherein the position of the entity in the activity array corresponds to the position of the entity in the unique ordering of the entities of the entity type, and wherein the value of each entry in the activity array corresponds to a function of a degree or a weighted degree in the monolayer network associated to the role; and
  (5) a coupling matrix, for every role, having a number of columns and a number of rows equal to the number of entities of the entity type, each column and row representing each entity in the same ordering as the unique ordering as in the activity array and containing in a main diagonal of the coupling matrix the activity array corresponding to the role and zeros everywhere else;
(D) generate, for a subset of the plurality of monolayer networks:
  a multilayer network wherein, each layer of the multilayer network corresponds to the monolayer network of each of the labeled connections in the subset of the monolayer networks of labeled connections, and wherein nodes that represent the same entity in different layers of the multilayer network are connected to each other;
  a supra-adjacency matrix of the multilayer network having:
    (i) a block structure determined by the roles that appear in the subset of the plurality of monolayer networks;
    (ii) an equal number of columns and row blocks; and
    (iii) one block for each role, each of the blocks having a size equal to the number of entities of the entity type associated to the role,
  each role in the block-columns of the supra-adjacency matrix is a source-role, and each role in the block-rows of the supra-adjacency matrix is a target-role, wherein:
    (i) the adjacency matrices of the unipartite monolayer networks from the labeled connections between entities of the same entity type are placed on the block of the supra-adjacency matrix corresponding to the intersection of the block column and block row corresponding to the same role;
    (ii) the adjacency matrices of the bipartite monolayer networks from the labeled connections between entities of different entity types are placed on two locations of the supra-adjacency matrix including:
      (A) one in the block column of a first role and block row of a second role; and
      (B) transposed in the block column of the second role and the block row of the first role; and
    (iii) a plurality of weighted directed interlayer connections between all nodes that represent the same entity in different roles, each weighted directed interlayer connection being represented, for every ordered pair of roles that belong to the same entity type in the supra-adjacency matrix by the coupling matrix of a target role that is placed in the block column of a source role and the block row of the target role;
(E) receive a plurality of coupling saliences (non-negative, real numbers), each of the coupling saliences corresponding to a non-empty block of the supra-adjacency matrix;
(F) construct a random walk model on the multilayer network; and
(G) provide one or more media content recommendations based on the random walk model.

13. The system according to claim 12, wherein the pair of specified entity types is the same entity types or distinct entity types.

14. The system according to claim 12, wherein the value of each entry in the activity array corresponds to:
(i) an in-degree or out-degree;
(ii) the weighted degree; or
(iii) a combination of (i) and (ii).

15. The system according to claim 12, wherein a weighted directed interlayer connection is provided if the entry corresponding to the target node in the activity array of its role is greater than zero.

16. The system according to claim 12, wherein empty blocks of the supra-adjacency matrix are assigned a salience equal to zero.

17. A computer implemented method for performing random walks on knowledge graphs, comprising:
receiving a plurality of knowledge graphs,
for each knowledge graph:
constructing a multilayer network having:
unipartite layers, wherein the unipartite layers comprise connections that origination from and terminate at the same node;
bipartite layers, wherein the bipartite layers comprise connections that originate from and terminate at different nodes; and
interlayer connections that:
(i) connect nodes of the unipartite layers and the bipartite layers that represent the same entity;
(ii) are directed; and
(iii) are weighted with a weight that depends on an activity of a target node in the unipartite layer or the bipartite layer in which the target node resides;
processing a random walk model of the multilayer network that takes into account saliencies of the interlayer connections and intralayer connections of the nodes; and
providing one or more media content recommendations based on the random walk model.

18. A computer implemented method for performing random walks on knowledge graphs, comprising:
receiving a plurality of knowledge graphs, each knowledge graph having a plurality of entities and a collection of types of labeled connections representing the relationships of the plurality of entities, each labeled connection being weighted or unweighted and each entity having:
(i) an entity type; and
(ii) a set of connections with other entities in the knowledge graph;
generating, for each type of labeled connection, a monolayer network, wherein each entity of the entity types connected by the labeled connection is represented by a node, thereby generating a plurality of monolayer networks;
assembling the plurality of monolayer networks into a multilayer network, wherein each layer of the multilayer network corresponds to one of the plurality of monolayer networks, wherein two or more nodes that represent the same entity are linked by an interlayer connection;
receiving a first plurality of coupling strengths, each of the first coupling strengths corresponding to one of the labeled connections;
receiving a second plurality of coupling strengths, each second coupling strength corresponding to the connections between nodes across layers of the multilayer network that represent the same entity;
constructing a random walk model on the multilayer network, wherein a probability of visiting a first node of the plurality of nodes from a second node of the plurality of nodes is proportional to:
(i) the weight of the labeled connection between the first node and the second node divided by the sum of all the weights of the connections that originate from the second node and multiplied by the first coupling strength of the corresponding labeled connection; or
(ii) the second coupling strength of the connection between the nodes across layers of the multilayer network that represent the same entity; and
providing one or more media content recommendations based on the random walk model.

19. The computer implemented method according to claim 18, wherein an entity can have one or more roles, and wherein each role represents a function performable, by the entity, with respect to connected entities.

20. A computer implemented method for performing random walks on knowledge graphs, comprising:
(A) receiving a plurality of knowledge graphs, each knowledge graph;
(x) having:
(i) a plurality of entities, each entity having an entity type; and
(ii) a plurality of labeled connections representing the relationships of the plurality of entities, each labeled connection having:
(i) a label; and
(ii) a pair of specified entity types including a first entity type and a second entity type;
(y) connecting a plurality of pairs of entities of the specified entity types; and
(z) being weighted or unweighted;
(B) generating, for each entity type, a unique ordering of all the entities belonging to that entity type;
(C) generating, for each labeled connection;
(1) a monolayer network, wherein each entity of the specified entity types is represented by a node, and wherein a labeled connection having a distinct pair of specified entity types is a bipartite monolayer network and a labeled connection having a non-distinct pair of specified entity types is a unipartite monolayer network, thereby generating a plurality of monolayer networks;
(2) an adjacency matrix for each monolayer network having:
a number of columns:
(i) equal to the number of entities of the first entity type; and
(ii) each column representing an entity of the first entity type in the unique ordering of the entities; and
a number of rows:
(i) equal to the number of entities of the second entity type; and
(ii) each row representing an entity of the second entity type in the unique ordering of the entities,
wherein each entry of the adjacency matrix has;
(i) a zero value if the entities represented by the column and row do not have a connection of the labeled connection; and
(ii) a non-zero value if the entities represented by the column and row do have a connection of the labeled connection, the non-zero value corresponding to the weight of the connection if the monolayer network is weighted and one (1) if the connection of the labeled connection is an unweighted connection;
(3) one role for each of the specified entity types, wherein each role represents a function performable, by the entity, with respect to connected entities, and wherein all entities of that entity type inherit the role;
(4) an activity array for each role, the activity array having a length equal to the number of entities of each distinct specified entity type, wherein the position of the entity in the activity array corresponds to the position of the entity in the unique ordering of the entities of the entity type, and wherein the value of each entry in the activity array corresponds to a function of a degree or a weighted degree in the monolayer network associated to the role; and
(5) a coupling matrix, for every role, having a number of columns and a number of rows equal to the number of entities of the entity type, each column and row representing each entity in the same ordering as the unique ordering as in the activity array and containing in a main diagonal of the coupling matrix the activity array corresponding to the role and zeros everywhere else;

(D) generate, for a subset of the plurality of monolayer networks:
a multilayer network wherein, each layer of the multilayer network corresponds to the monolayer network of each of the labeled connections in the subset of the monolayer networks of labeled connections, wherein nodes that represent the same entity in different layers of the multilayer network are connected to each other;
a supra-adjacency matrix of the multilayer network having;
(i) a block structure determined by the roles that appear in the subset of the plurality of monolayer networks;
(ii) an equal number of columns and row blocks; and
(iii) one block for each role, each of the blocks having a size equal to the number of entities of the entity type associated to the role,
each role in the block-columns of the supra-adjacency matrix is a source-role, and each role in the block-rows of the supra-adjacency matrix is a target-role, wherein:
(i) the adjacency matrices of the unipartite monolayer networks from the labeled connections between entities of the same entity type are placed on the block of the supra-adjacency matrix corresponding to the intersection of the block column and block row corresponding to the same role;
(ii) the adjacency matrices of the bipartite monolayer networks from the labeled connections between entities of different entity types are placed on two locations of the supra-adjacency matrix including:
(A) one in the block column of a first role and block row of a second role; and
(B) transposed in the block column of the second role and the block row of the first role; and
(iii) a plurality of weighted directed interlayer connections between all nodes that represent the same entity in different roles, each weighted directed interlayer connection being represented, for every ordered pair of roles that belong to the same entity type in the supra-adjacency matrix by the coupling matrix of a target role that is placed in the block column of a source role and the block row of the target role;

(E) receiving a plurality of coupling saliences (non-negative, real numbers), each of the coupling saliences corresponding to a non-empty block of the supra-adjacency matrix;
(F) constructing a random walk model on the multilayer network; and
(G) providing one or more media content recommendations based on the random walk model.

* * * * *